United States Patent [19]

Morishita et al.

[11] Patent Number: 4,842,087
[45] Date of Patent: Jun. 27, 1989

[54] MOTOR DRIVEN TYPE POWER STEERING CONTROL DEVICE

[75] Inventors: Mitsuharu Morishita; Shinichi Kouge, both of Hyogo, Japan

[73] Assignee: Mitsubishi Denki Kabushiki Kaisha, Tokyo, Japan

[21] Appl. No.: 178,056

[22] PCT Filed: Jul. 11, 1987

[86] PCT No.: PCT/JP87/00498
§ 371 Date: Mar. 7, 1988
§ 102(e) Date: Mar. 7, 1988

[87] PCT Pub. No.: WO88/00547
PCT Pub. Date: Jan. 28, 1988

[30] Foreign Application Priority Data

Jul. 11, 1986 [JP] Japan .................. 61-164160
Jul. 11, 1986 [JP] Japan .................. 61-164162
Jul. 11, 1986 [JP] Japan .................. 61-166197

[51] Int. Cl.⁴ ............................................. B62D 5/04
[52] U.S. Cl. ........................... 180/79.1; 364/424.01
[58] Field of Search ..................... 180/79.1, 142; 74/388 PS; 364/424, 424.01

[56] References Cited

U.S. PATENT DOCUMENTS

| 4,621,327 | 11/1986 | Dolph et al. | 180/79.1 X |
| 4,715,461 | 12/1987 | Shimizu | 180/79.1 |
| 4,715,463 | 12/1987 | Shimizu | 180/79.1 |

FOREIGN PATENT DOCUMENTS 50-38230   4/1975  Japan .
60-209365 10/1985  Japan .
61-21675   2/1986  Japan .
61-94478   6/1986  Japan .

*Primary Examiner*—John A. Pekar
*Attorney, Agent, or Firm*—Sughrue, Mion, Zinn, Macpeak & Seas

[57] ABSTRACT

Prevention of damage to motor and power elements and a steering of a steering wheel during a lock condition of a mechanical system are enabled by distinguishing a lock of the motor and the lock of the mechanical system from a steering of the steering wheel around steering wheel lock positions and by removing a motor current and disengaging an electromagnetic clutch based on the distinction. When the steering wheel is operated around the steering wheel lock positions, a feeling of physical disorder of steering is minimized by reducing the motor current to zero within a predetermined time period.

6 Claims, 9 Drawing Sheets

MOTOR DRIVEN TYPE POWER STEERING CONTROL DEVICE

FIELD OF TECHNOLOGY

This invention relates to a motor driven type power steering control device for assisting an operation of a steering device of an automobile with rotational force of a motor.

BACKGROUND OF TECHNOLOGY

A conventional power steering device of this type assists an operation of a steering shaft or a rack shaft with driving force of a motor through a reduction mechanism and a transmission mechanism such as gears or belts.

Since, in such a conventional power steering device, it is impossible to distinguish between a malfunction of the motor or other mechanical systems, such as locking thereof, and a locking of a steering wheel, there may be a case where a current supply to the motor is continued for long enough to heat power elements for controlling the motor to high temperature, causing them to be damaged and/or making steering impossible by such mechanical locking, causing a severe accident to occur.

This invention was made in view of such problems, and an object of this invention is to obtain a motor driven power steering control device capable of preventing a motor and power elements from being damaged by excessive temperature and of making steering wheel operation possible when mechanical locking occurs to thereby assure safe operation of an automobile.

DISCLOSURE OF THE INVENTION

In this invention, when a steering wheel becomes heavy due to a motor locking or a locking of a mechanical system, a discrimination means distinguishes the locking of the motor or the mechanical system from a steering around wheel locking positions to reduce a motor current to zero and disengage an electromagnetic clutch, so that damage to the motor and power elements are prevented and steering operation becomes possible even if mechanical locking occurs.

Further, in this invention, motor current is made zero and, simultaneously, the electromagnetic clutch is disengaged. Then, when the steering is performed around the wheel locking positions, motor current is made zero within a predetermined time, so that the power steering can be performed with minimized abnormal feeling of steering.

PREFERRED EMBODIMENTS FOR PRACTICING THE INVENTION

The present invention now will be described in detail, with reference to the accompanying drawings.

Figure 1:
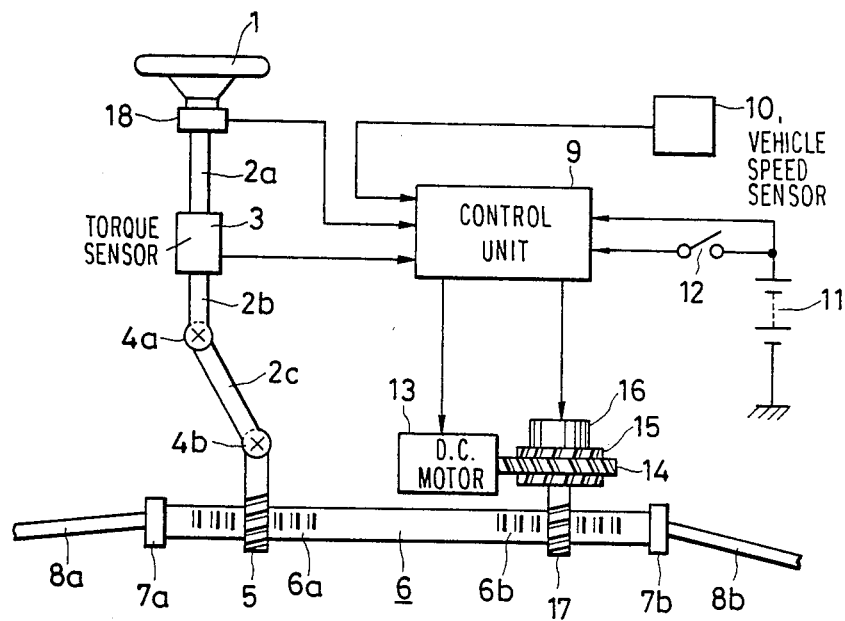
FIG. 1 shows a construction of a motor driven power steering control device according to an embodiment of this invention.

FIG. 1 shows a construction of a motor driven power steering control device according to this invention, together with a block circuit diagram, in which 1 is a steering wheel to be operated by rotational steering force given by a driver, 3 is a torque sensor for providing a signal corresponding to the rotational force applied to the steering wheel 1, 4a is a first universal joint, 4b is a second universal joint, 2a is a first steering shaft connecting the steering wheel 1 and the torque sensor 3, 2b is a second steering shaft connecting the torque sensor 3 and the first universal joint 4a, 2c is a third steering shaft connecting the first universal joint 4a and the second universal joint 4b, 5 is a first pinion shaft connected to the second universal joint, 6 is a rack shaft having a first rack toothed portion 6a meshed with the pinion shaft 5 and a second toothed portion 6b, 7a is a ball joint connecting a tie rod 8a and an end of the first rack teeth portion 6a and 7b is another ball joint connecting another tie rod 8b and an end of the second rack teeth portion 6b. 9 is a control unit, 10 is a vehicle speed sensor for detecting a vehicle speed, 11 is a vehicle mounted battery, 12 is a key switch and 13 is a d.c. motor having a shunt field or magnetic field and adapted to be driven by the battery 11 through the control unit 9. 14 is a worm shaft connected to an output shaft of the motor 13 and forming a gear reduction device, 15 is a worm wheel meshed with the worm shaft 14 for driving the latter, 16 is an electromagnetic clutch for mechanically engaging or disengaging a connection between the wheel shaft 15 and a second pinion shaft 17 meshed with the second rack teeth portion 6b according to an instruction from the control unit 9 and 18 is a steering angle sensor for detecting a steering angle of the steering wheel 1.

Figure 2:
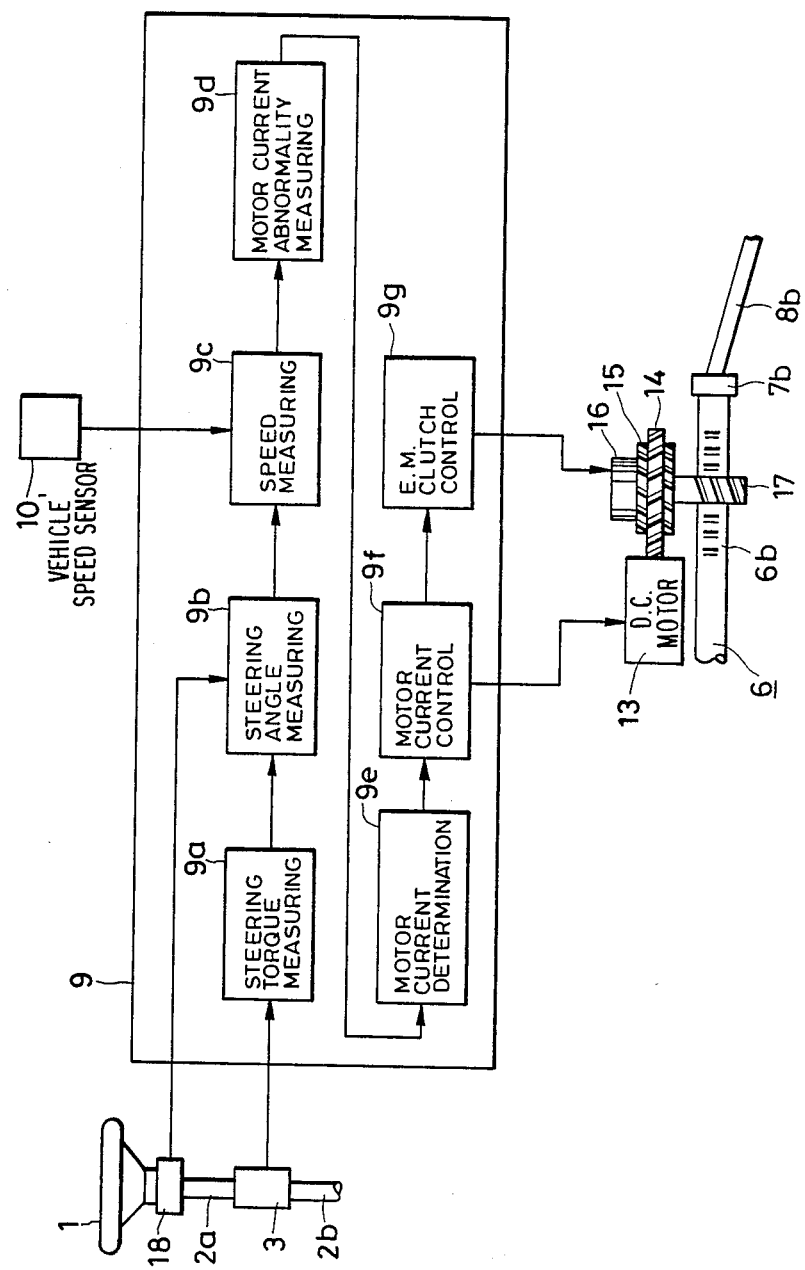
FIG. 2 is a block circuit diagram of a control unit.

FIG. 2 shows a block circuit diagram of the control unit 9, in which 9a is a steering torque measuring means responsive to an input from the torque sensor 3 to measure the steering angle, 9b is a steering angle measuring means responsive to an output of the steering angle sensor 18 to measure the steering angle of the steering wheel, 9c is a vehicle speed measuring means responsive to an input from the vehicle speed sensor 10 to measure a vehicle speed, 9d is an abnormal motor current judging means for deciding whether a motor current is abnormal when a motor current indication corresponding to the steering torque exceeds a predetermined current value where the steering angle is within a predetermined angle range near the steering wheel locking position, 9e is a motor current determination means for normally setting the motor current to a value corresponding to the steering torque and setting it to zero when an output of the abnormal motor current judging means 9d indicates an abnormal condition, 9f is a motor current control means responsive to an output of the determination means 9e for controlling the motor current and 9g is an electromagnetic clutch control means for on-off controlling the electromagnetic clutch 16 according to a condition determined by at least the vehicle speed.

Figure 3:
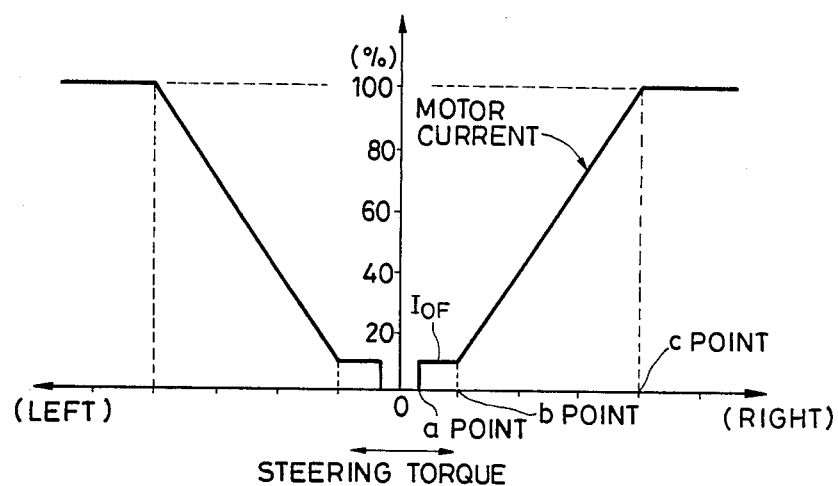
FIG. 3 is a steering torque vs. motor current curve showing control characteristics.
Figure 4:
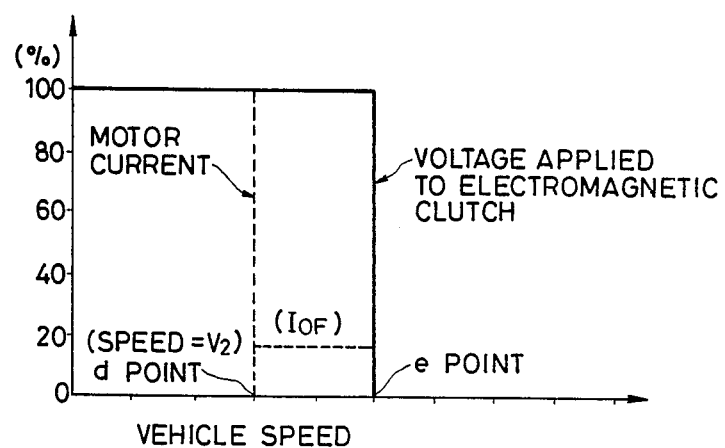
FIG. 4 shows a vehicle speed vs. motor current curve and a vehicle speed vs. voltage applied to an electromagnetic clutch curve showing control characteristics.
Figure 5:
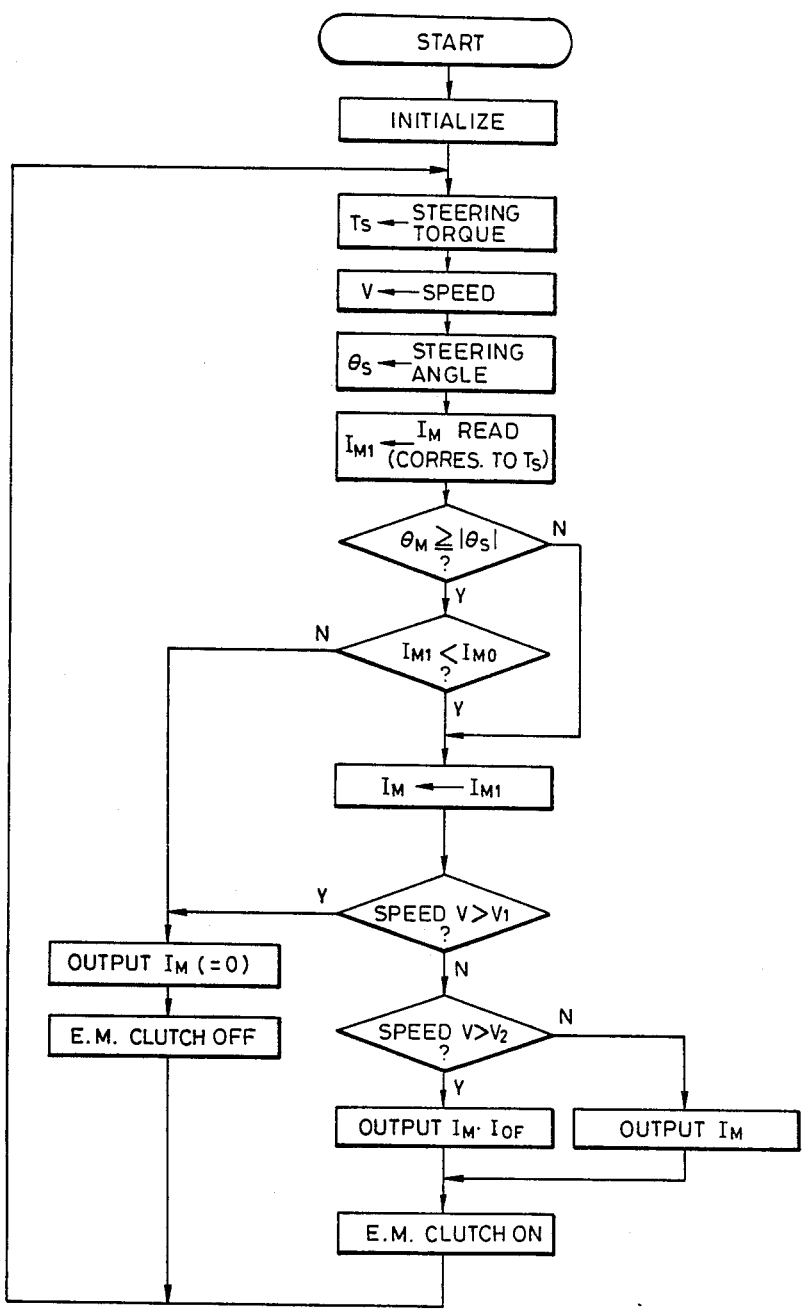
FIG. 5 is a flow chart of a control program.

Operation of the foregoing now will be described with reference to FIGS. 3 to 5. FIG. 3 shows control characteristics of motor current with respect to steering torque, FIG. 4 shows control characteristics of motor current and voltage applied to the electromagnetic clutch with respect to vehicle speed and FIG. 5 is a flow chart showing a control program of the control unit 9.

Firstly, when the key switch 12 is turned on to start an engine, the electromagnetic clutch 16 is engaged to mechanically connect the worm wheel shaft 15 to the second pinion shaft 17. When the steering wheel 1 is turned under this condition, the control unit 9 controls a current of the motor 13 as shown in FIG. 3. In FIG. 3, when the steering torque is increased rightwardly, the motor 13 is energized at a point a and a current $I_{OF}$ (on the order of 2 to 10 A) flows to reduce an effect of inertia of the motor and other mechanical systems. With a further increase of the steering torque, the motor current is increased linearly with respect to the steering torque from a point b to a point c at which the motor current becomes 100%. When the steering torque is decreased to the point c, the motor current starts to decrease and it becomes $I_{OF}$ at the point b. With a further reduction of the torque to the point a, the motor is deenergized. This control is the same in a leftward variation of the torque. A relation of transmission torque to motor current is linear. Therefore, when the torque increases in FIG. 3, the motor is energized at the point a and the motor current $I_{OF}$ flows. Since, with a further increase of the torque, the control increases the motor current gradually from the point b, an output torque to the worm shaft 14 increases gradually and thus an auxiliary torque corresponding to force applied by the driver to the steering wheel is transmitted through the worm wheel shaft 15, the electromagnetic clutch 16 and the second pinion shaft 17 to the second rack teeth portion 6b. Therefore, the steering wheel 1 becomes light. The above is the operation of this device when the vehicle is stationary.

When the vehicle is moving, the control of motor current is to reduce it to $I_{OF}$ at speed (vehicle speed=$V_2$) at a point d and to zero, together with a reduction of the voltage applied to the electromagnetic clutch 16 to zero, at speed (vehicle speed=$V_1$) at a point e, as shown in FIG. 3. Since, therefore, the worm wheel 15 is separated from the second pinion shaft 17, the driver steers the steering wheel without the auxiliary energization. On the other hand, in a case where the steering wheel 1 is operated around the locking position such as in the case of steering while the vehicle is stationary, it is impossible to distinguish the situation from a case where the steering operation is heavy due to that it is performed around the locking position when an accident such as locking of the motor 13 or other mechanical system, so that the motor 13 may be supplied with current continuously. Therefore, because of heat generation, there may be a possibility of damage to the power elements constituting a portion of the motor 13 and to the control unit 9 which controls the motor.

Further, there may be a case where it becomes impossible to steer the steering wheel because of mechanical locking, leading to a dangerous accident. In this invention, a situation where an absolute value of the steering wheel angle is within a predetermined angle $\theta_M$ which is close to the steering wheel locking position and an instruction value of the motor current corresponding to the steering torque is decided as an abnormal condition, where upon the motor current is made zero and simultaneously the electromagnetic clutch 16 is disengaged to prevent the motor 13 and the power elements from being damaged by overheating and to allow the steering in the machanical locking condition, as shown by the flow chart in FIG. 5.

In the embodiment mentioned above, the steering angle sensor is used as means for distinguishing the locking of the motor and other mechanical system from the steering around the steering wheel locking position. A second embodiment which uses another means as this distinguishing means will be described.

Figure 6:
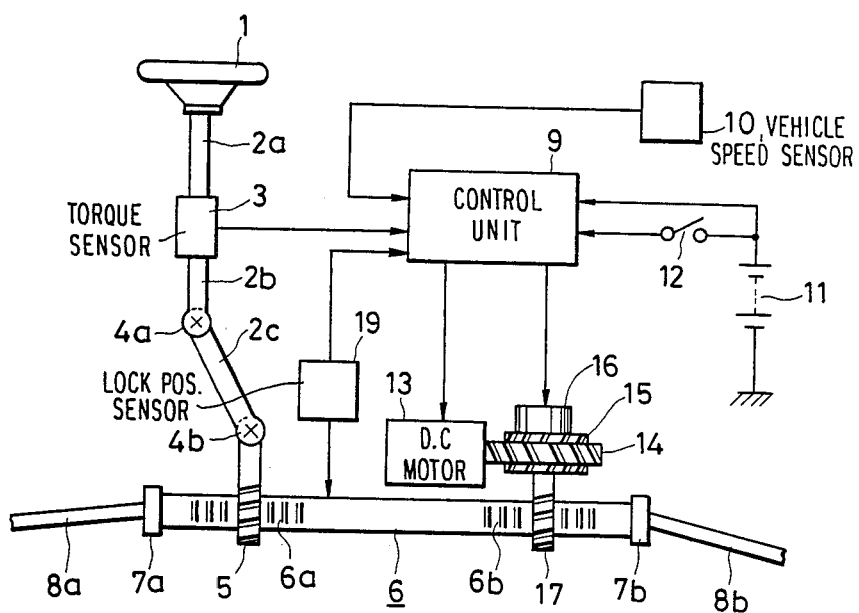
FIG. 6 is a construction of a motor driven power steering control device according to a second embodiment of this invention.

FIG. 6 shows a construction of the second embodiment of the motor driven power steering control device according to this invention, in which same reference numerals used in FIG. 1 depict same or corresponding components, respectively. A portion of the embodiment in FIG. 2 which is different from the device in FIG. 1 is a lock position sensor 19 for detecting opposite lock positions of front wheels during a steering which is provided instead of the steering angle sensor 18 in FIG. 1.

A circuit construction of the control unit 9 is different from that in FIG. 1 necessarily due to the difference shown in FIG. 6. A block diagram of the circuit construction of the control unit 9 is shown in FIG. 7.

Figure 7:
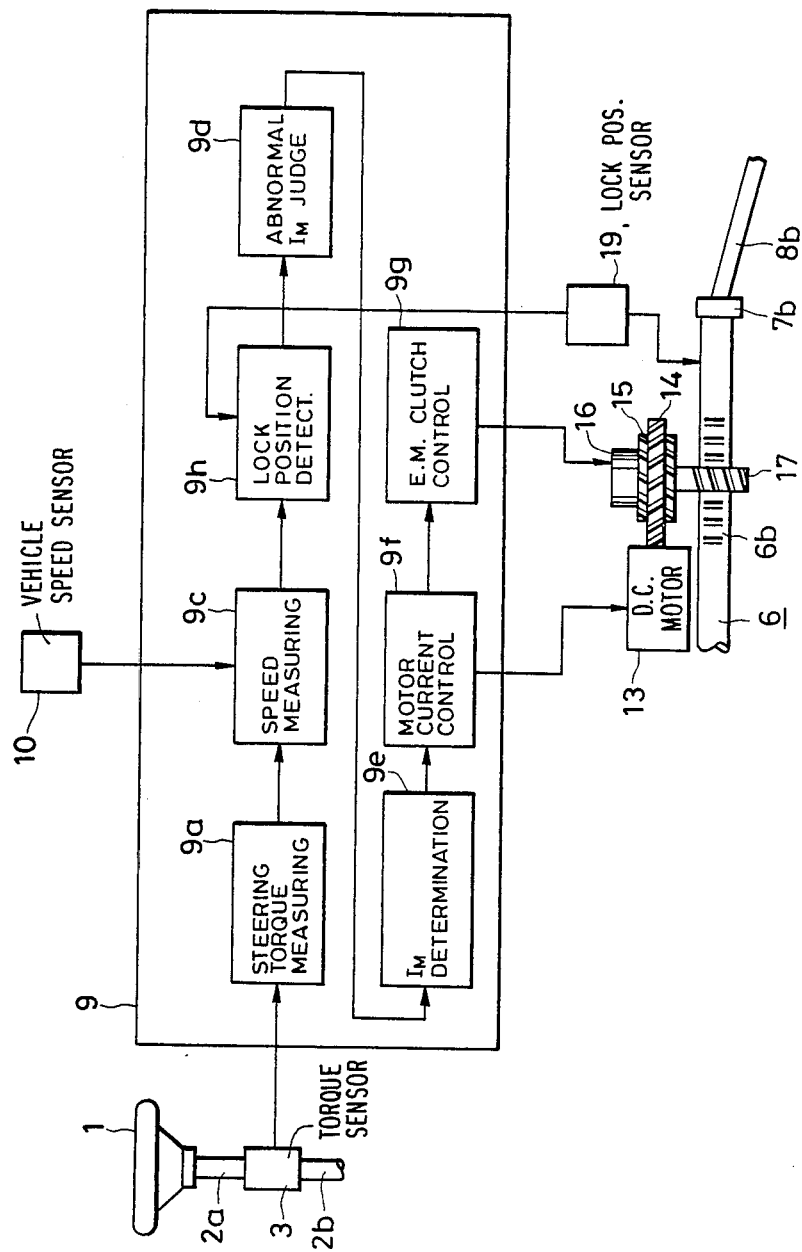
FIG. 7 is a block circuit diagram of a control unit in the second embodiment.

As shown in FIG. 7, 9a is a steering torque measuring means responsive to an input from a torque sensor 3 for measuring a steering torque, 9c is a vehicle speed measuring means responsive to an input from a vehicle speed sensor 10 for measuring a vehicle speed, 9h is a lock position detecting means for detecting lock positions of respective front wheels during steering, 9d is an abnormal motor current judging means for judging an abnormality of situation when an output of the lock position detecting means 9h is outside the lock position and an indicated value of motor current corresponding to a steering torque exceeds a predetermined value, 9e is a motor current setting means for normally setting the motor current to a value corresponding to the steering torque and setting it to zero when an output of the abnormal motor current detecting means 9d indicates an abnormality, 9f is a motor current control means responsive to an output of the setting means 9e for controlling motor current and 9g is a control means of an electromagnetic clutch 16 for engaging or disengaging the electromagnetic clutch 16 according to a condition determined by at least the vehicle speed.

Figure 8:
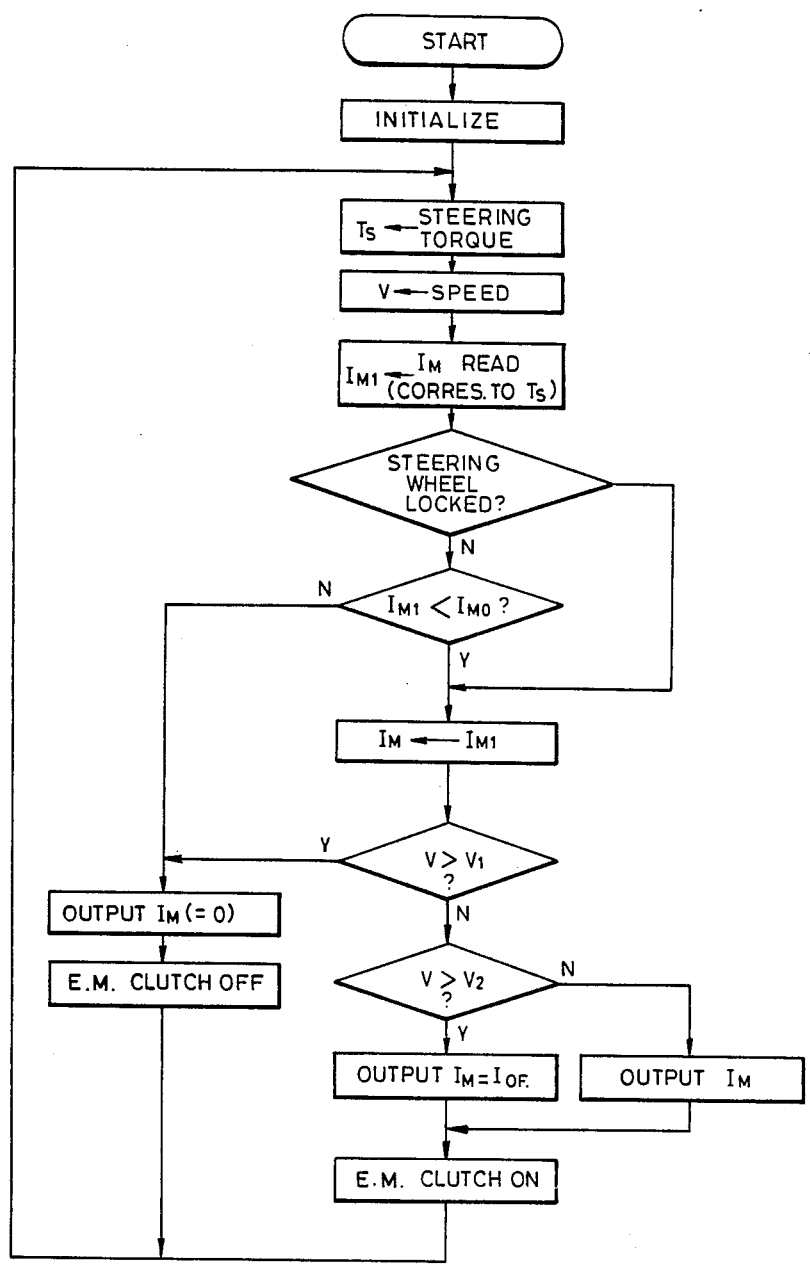
FIG. 8 is a flow chart of a control program for the second embodiment.

In the second embodiment, as shown in a flow chart in FIG. 8, a situation where an output of the lock position sensor 19 for detecting a left and right lock positions during a steering indicates out of lock position and an instructed value of the motor current which corresponds to the steering torque exceeds a predetermined current value $I_{MO}$ is decided as abnormal where upon the motor current is made zero and the electromagnetic clutch 16 is disengaged to prevent the motor and power elements from being damaged by overheating and to allow steering during mechanical locking.

Further, another embodiment will be described, in which the motor current setting means 9e of the control unit 9 in the second embodiment shown in FIG. 7 is constituted such that it normally changes the motor current from a value corresponding to the steering torque, to zero when the output of the abnormal motor current judging means 9d indicates an abnormality and to a value which reduces to zero or a predetermined value steppingly within a second predetermined time period after a first predetermined time from a time instance at which the lock position sensor 19 provides an output indicating a detection of lock position.

Figure 9:
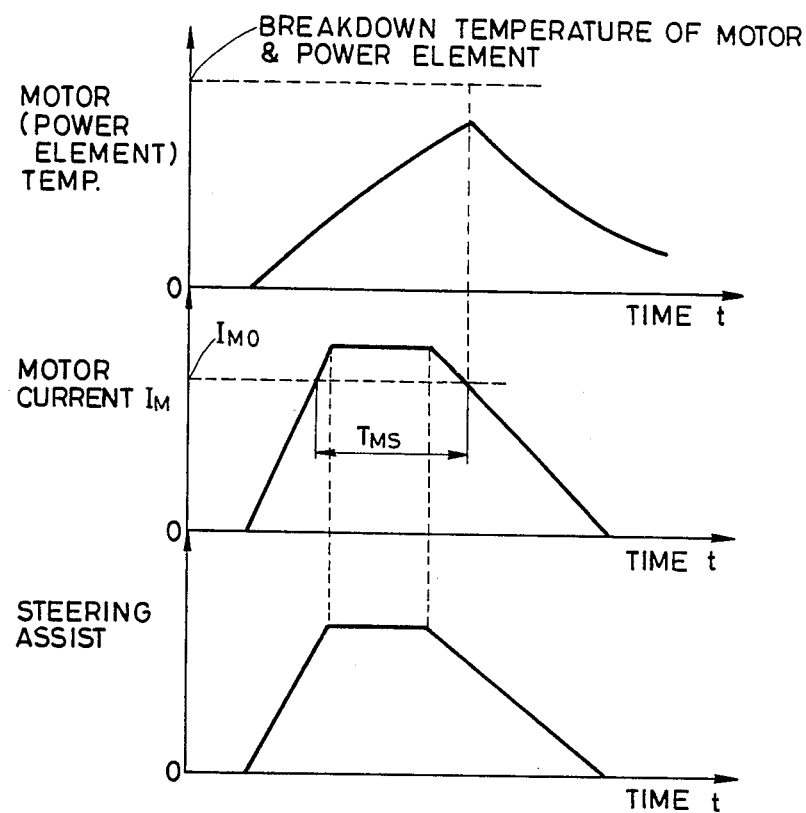
FIG. 9 is a motor current vs. time curve showing a current reducing control characteristics when a supply of current exceeding a predetermined value to the motor is continued for a predetermined time period or longer.
Figure 11:
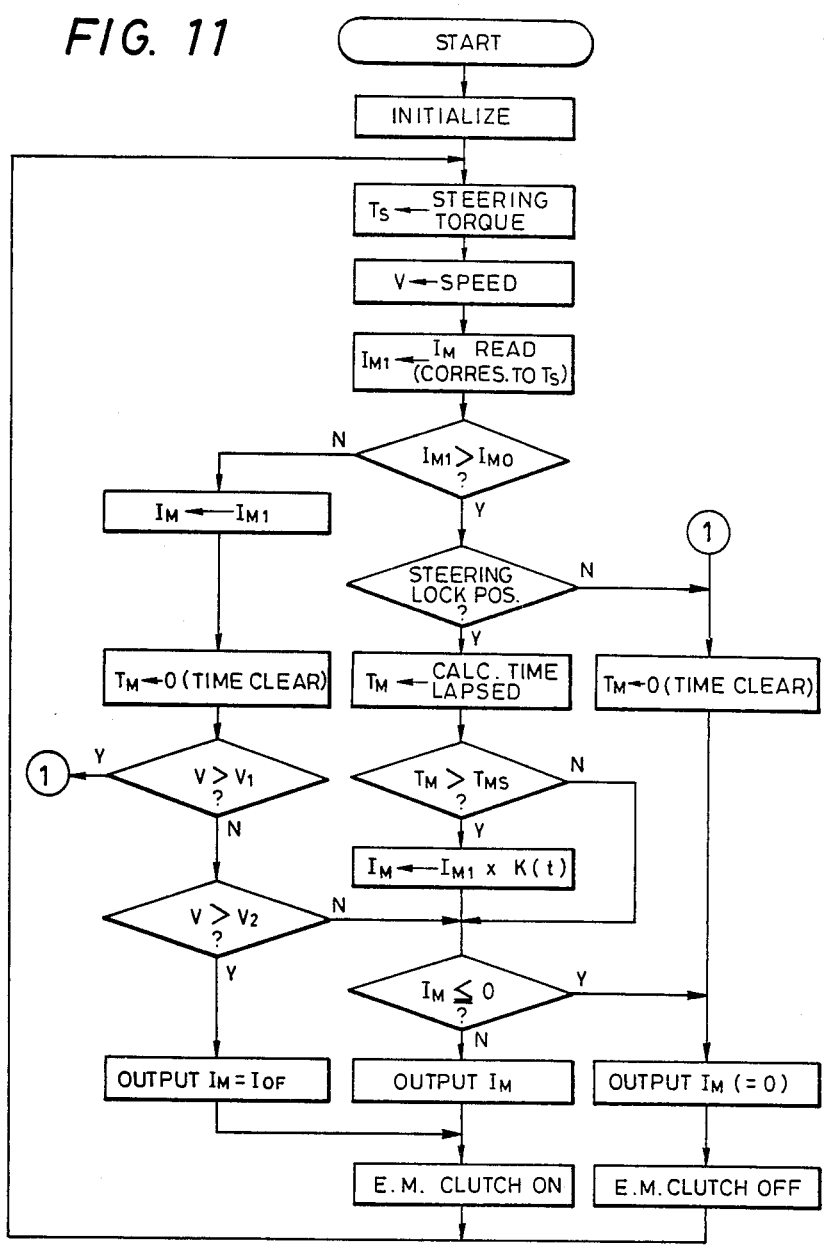
FIG. 11 is a flow chart of a control program for another embodiment.

In this embodiment, as shown in FIG. 11, a situation where an output of the lock position sensor 19 for detecting a right and left lock positions of the front wheels when the steering wheel is operated indicates a detection of no lock position and an instructed value of the motor current corresponding to the steering torque exceeds a predetermined current value $I_{MO}$ (e.g., 15 to 25 A) is decided as abnormal, upon which the motor current is made zero and the electromagnetic clutch 16 is disengaged to prevent the motor 13 and the power elements from being damaged by overheating and to allow a steering during the mechanical lock. Then, as shown in FIG. 9 which shows reduction control characteristics of motor current with time when the supply of current exceeding a predetermined value to the motor 13 is continued for longer than a predetermined time, when the output of the lock position sensor 19 indicates a detection of a lock position and the motor current exceeding the predetermined current value $I_{MO}$ is continued for a predetermined time $T_{MS}$ (e.g., 10 sec to 1 min), control shown by the flow chart in FIG. 7 is performed to prevent the power elements which constitute a portion of the motor 13 and a portion of the control unit 9 and control the current supply to the motor from being damaged by temperature increase. That is, the motor current is controlled on the basis of a value which is a product of an attenuation constant $K_T$ which reduces gradually with time and a motor current $I_M$ which corresponds to the steering torque. As a result, the motor current is reduced gradually and becomes zero within a predetermined time period (e.g., 30 sec to 5 min) and the voltage applied to the electromagnetic clutch 16 is also controlled to zero to disengage the worm wheel shaft 15 from the second pinion shaft 17, resulting in a steering without assist.

Figure 10:
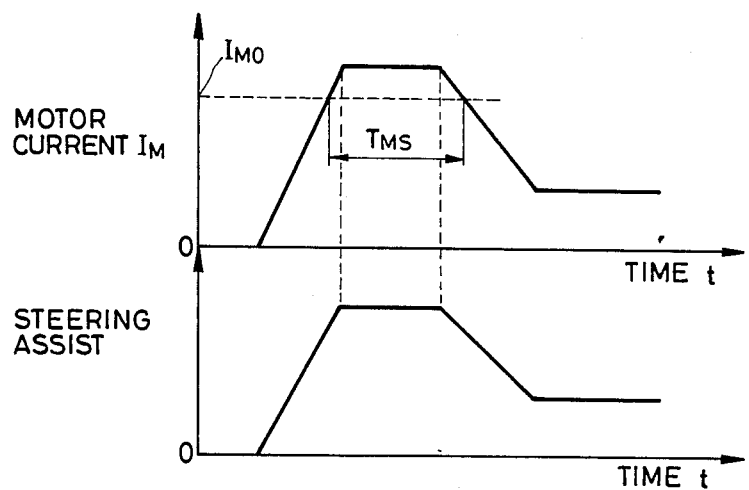
FIG. 10 is a motor current vs. time curve showing current reducing characteristics in another embodiment

FIG. 10 shows changes in reduction control characteristics of the motor current with time according to another embodiment of the invention. It is possible to obtain the same effect by reducing the motor current during the motor current reducing control to a non-zero predetermined current value which then is held as shown in this figure.

POSSIBILITY OF INDUSTRIAL UTILIZATION

As described hereinbefore, according to this invention, motor lock and mechanical lock are distinguished from steering around the steering wheel lock positions to reduce the motor current to zero and simultaneously disengage the electromagnetic clutch. Therefore, it is possible to prevent the motor and the power elements from being damaged and to steer the steering wheel even during mechanical lock, resulting in a highly safe power steering.

Since the motor current is controlled so as to be gradually reduced for steering around the steering wheel lock positions, a feeling of physical disorder of steering is minimized, resulting in highly safe power steering.

We claim:
1. A motor driven power steering control device, comprising:
   a vehicle speed sensor for sensing a vehicle speed;
   a torque sensor mounted on a steering shaft for detecting a rotational force of a steering wheel;
   means for distinguishing whether a lock state of said steering wheel is caused by at least one of a motor lock and a lock of a mechanical system or by steering said steering wheel through angular steering wheel lock positions;
   a control unit supplied with signals from said vehicle speed sensor, said torque sensor and said distinguishing means and providing a responsive output accordingly;
   a d.c. motor driven by a vehicle mounted battery through said control unit; and
   and electromagnetic clutch connected directly to an output shaft of said d.c. motor and on-off controlled in accordance with said output of said control unit.

2. The motor driven power steering control device as claimed in claim 1, wherein said distinguishing means comprises a steering angle sensor for detecting an angle of said steering wheel.

3. The motor driven power steering control device as claimed in claim 2, wherein said control unit comprises:
   steering torque measuring means, responsive to an input from said torque sensor, for measuring the steering angle;
   steering angle measuring means, responsive to an output of said steering angle sensor, for measuring the steering angle of said steering wheel;
   vehicle speed measuring means, responsive to an input from said vehicle speed sensor, for measuring a vehicle speed;
   abnormal motor current judging means for determining a motor current to be abnormal when a motor current indication corresponding to the steering torque exceeds a predetermined current value and the steering angle is within a predetermined angle range near the steering wheel locking position;
   motor current determination means for normally setting the motor current to a value corresponding to the steering torque, and for setting it to zero when an output of said abnormal motor current judge means indicates the motor current to be abnormal;
   motor current control means, responsive to an output of said determination means, for controlling the motor current; and
   an electromagnetic clutch control means for on-off controlling said electromagnetic clutch when the vehicle speed is above at least one predetermined value.

4. The motor driven power steering control device as claimed in claim 1, wherein said distinguishing means comprises a lock position sensor for detecting a left and a right lock position of front wheels of a vehicle during an operation of said steering wheel.

5. The motor driven power steering control device as claimed in claim 4, wherein said control unit comprises:
   steering torque measuring means, responsive to an input from said torque sensor, for measuring the steering angle;

vehicle speed measuring means for measuring a vehicle speed;

lock position detecting means, responsive to an input from said lock position sensor, for detecting a left and a right lock position of front wheels of a vehicle during an operation of said steering wheel;

abnormal motor current judging means for determining a motor current to be abnormal when a motor current indication corresponding to the steering torque exceeds a predetermined current value where an output of said lock position detecting means indicates no detection of the lock position;

motor current determination means for normally setting the motor current to a value corresponding to the steering torque and setting it to zero when an output of said abnormal motor current judging means indicates an abnormal condition;

motor current control means, responsive to an output of said decision means, for controlling the motor current; and electromagnetic clutch control means for on-off controlling said electromagnetic clutch when the vehicle speed is greater than at least one predetermined value.

6. The motor driven power steering control device as claimed in claim 4, wherein said control unit comprises:

stering torque measuring means, responsive to an input from said torque sensor, for measuring the steering angle;

vehicle speed measuring means for measuring a vehicle speed;

lock position detecting means, responsive to an input from said lock position sensor, for detecting a left and a right lock position of front wheels of a vehicle during an operation of said steering wheel;

abnormal motor current judging means for determining a motor current to be abnormal when a motor current indication corresponding to the steering torque exceeds a predetermined current value where the steering angle is within a predetermined angle range near the steering wheel locking position;

motor current determination means for normally setting the motor current to a value corresponding to the steering torque, setting it to zero when an output of said abnormal motor current judging means indicates an abnormal condition, and setting it to a value which is reduced to zero or a predetermined value steppingly within a second predetermined time period after a first predetermined time period from a time at which an output of said lock position sensor indicates a detection of lock position;

motor current control means responsive to an output of said determination means for controlling the motor current; and electromagnetic clutch control means for on-off controlling said electromagnetic clutch when the vehicle speed is greater than at least one predetermined value.

* * * * *